United States Patent [19]

Tanaka et al.

[11] Patent Number: 5,443,297
[45] Date of Patent: Aug. 22, 1995

[54] STRUCTURE OF SIDE PORTION OF VEHICLE BODY

[75] Inventors: Minoru Tanaka; Tsutomu Shimizu, both of Toyota, Japan

[73] Assignee: Toyoda Jidosha Kabushiki Kaisha, Toyota, Japan

[21] Appl. No.: 179,244

[22] Filed: Jan. 10, 1994

[30] Foreign Application Priority Data

Jan. 22, 1993 [JP] Japan .................................. 5-009223

[51] Int. Cl.⁶ ............................................. B62D 25/20
[52] U.S. Cl. ...................................... 296/203; 296/30; 296/209
[58] Field of Search ............... 296/187, 188, 203, 204, 296/209, 29, 30

[56] References Cited

U.S. PATENT DOCUMENTS

| | | | |
|---|---|---|---|
| 3,031,224 | 4/1962 | Komenda et al. | 296/209 |
| 4,493,506 | 1/1985 | Alexander | 296/209 |
| 5,209,541 | 5/1993 | Janotik | 296/209 X |

FOREIGN PATENT DOCUMENTS

| | | | |
|---|---|---|---|
| 60-157374 | 10/1985 | Japan . | |
| 127175 | 5/1990 | Japan | 296/209 |
| 4056688 | 2/1992 | Japan | 296/209 |

Primary Examiner—Dean Kramer
Attorney, Agent, or Firm—Cushman, Darby & Cushman

[57] ABSTRACT

A structure of a side portion of a vehicle body having a side outer panel in which a side sill outer member and a pillar outer member are integrally formed. A first enclosed cross-sectional member is formed by a connecting of a side sill inner member and a side sill reinforcing member. Further, the first enclosed cross-sectional member has first connecting members which are formed by a connecting of the side sill reinforcing member and the side sill inner member. A second enclosed cross-sectional member is formed by a connecting of the side sill outer member and the side sill reinforcing member. Moreover, the second enclosed cross-sectional member has second connecting members which are formed by a connecting of the side sill outer member and the side sill reinforcing member. The second connecting members are located outwardly of the first connecting members in the transverse direction of the vehicle body and are apart from the first connecting members. Therefore, a difference between an amount by which the pillar outer member swells outward in the transverse direction of the vehicle body and the drawing depth of the side sill outer member can be made larger.

13 Claims, 7 Drawing Sheets

STRUCTURE OF SIDE PORTION OF VEHICLE BODY

BACKGROUND OF THE INVENTION

1. Field of the Invention

The present invention relates to a structure of a side portion of a vehicle body, and more particularly to a structure of a side portion of a vehicle body having a side outer panel in which a side sill outer member and a pillar outer member are integrally constructed.

2. Description of the Related Art

As shown in FIG. 5, a conventional structure of a side portion of a vehicle body includes a side outer panel 78, in which a front pillar outer portion 70, a roof rail outer portion 72, a side sill outer portion 74 and a center pillar outer portion 76 are integrally formed. This structure is well known, and an example thereof is shown in Japanese Utility Model Application Laid-Open No. 60-157374.

According to this structure of the side portion of the vehicle body, a side inner portion 88, in which a front pillar inner portion 80, a roof rail inner portion 82, a side sill inner portion 84 and a center pillar inner portion 86 are integrally formed, is disposed at the interior of the side outer panel 78. A side sill reinforcing member 90 is provided at the rear portion of the structure between the side sill outer portion 74 and the side sill inner portion 84.

As shown in FIG. 6, in this type of a structure of a side portion of a vehicle body, the side sill inner portion 84 of the side inner portion 88 has connecting flanges 84A and 84B. The side sill reinforcing member 90 has connecting flanges 90A and 90B. The side sill outer portion 74 of the side outer panel 78 has connecting flanges 74A and 74B. The three members 84A, 90A, and 74A are superposed and connected together. In the same way, the other three members 84B, 90B, and 74B are superposed and connected together.

Accordingly, as shown in FIG. 7, the front pillar outer portion 70 and the center pillar outer portion 76 or the like of the side outer panel 78, which form a design surface of a vehicle body, swell outwardly in the transverse direction of the vehicle. In this case, a drawing depth H1 of the side sill outer portion 74 becomes too large with respect to a width W of the cross section of the side sill, which is necessary to maintain the rigidity of the side sill portion. (W is the maximum length of the cross-sectional lengths of the side sill in the transverse direction of the vehicle body. H1 is the length of the longest normal line among a plurality of lines normal to a reference line whose lengths are respectively defined as a distance between the side sill outer panel 74 and the reference line. The reference line connects the end portion which projects furthest inwardly in the transverse direction of the vehicle among the connecting portions between the roof rail outer portion 72 and the roof rail inner portion 82 in the upward direction of the vehicle, and a connecting portion between the connecting flanges 74B and 90B.) As a result, a difference between the amount H2 by which the center pillar outer portion 76 and the like swell outwardly in the transverse direction of the vehicle and the drawing depth H1 cannot be made large at a design surface of the vehicle body. The design surface includes the front pillar outer portion 70, the center pillar outer portion 76 and the like which form the side outer panel 78. (H2 is the length of the longest normal line among a plurality of lines normal to the aforementioned reference line whose lengths are respectively defined as a distance between the side outer panel 78 and the reference line.)

SUMMARY OF THE INVENTION

In view of the aforementioned facts relating to the present invention, it is an object of the present invention to provide a structure of a side portion of a vehicle body which can increase an amount by which a pillar outer portion swells outwardly in the transverse direction of the vehicle with respect to a drawing depth of the side sill outer portion, which constitutes a side outer panel, while maintaining the rigidity of the side sill portion.

The present invention is a structure of a side portion of a vehicle body having a side outer panel in which a side sill outer member and a pillar outer member are integrally formed, comprising: a side sill inner member, which is provided inwardly with respect to said side sill outer member in a transverse direction of the vehicle body; a side sill reinforcing member, which is provided between said side sill outer member and said side sill inner member; a first enclosed cross-sectional member formed by a connecting of said side sill inner member and said side sill reinforcing member such that a longitudinal direction of said first enclosed cross-sectional member runs substantially along a longitudinal direction of the vehicle body, said first enclosed cross-sectional member having first connecting members which are formed by a connecting of said side sill reinforcing member and said side sill inner member; and a second enclosed cross-sectional member formed by a connecting of said side sill outer member and said side sill reinforcing member such that a longitudinal direction of said second enclosed cross-sectional member runs substantially along the longitudinal direction of the vehicle body, said second enclosed cross-sectional member having second connecting members which are formed by a connecting of said side sill outer member and said side sill reinforcing member, and said second connecting members being located outwardly of said first connecting members in the transverse direction of the vehicle body and being apart from said first connecting members.

According to the present invention having the above-described structure, the side sill outer member connects the side sill reinforcing member at a position located further outward in the transverse direction of the vehicle than the first connecting members, at which the side sill reinforcing member and the side sill inner member are connected. Consequently, a proportion of a drawing depth of the side sill outer member of the side outer panel to a width of the cross section of the side sill, which is formed by the first and the second enclosed cross-sectional portions, can be made smaller. As a result, the difference between the amount by which the pillar outer member swells outward in the transverse direction of the vehicle body and the drawing depth of the side sill outer member can be made larger while the rigidity of the side sill portion is maintained. Therefore, the amount by which the design surface of the vehicle body swells outward in the transverse direction of the vehicle body can be made larger.

DESCRIPTION OF THE PREFERRED EMBODIMENTS

An embodiment of a structure of a side portion of a vehicle body relating to the present invention will now be described in accordance with FIGS. 1–4.

Note that arrow FR shows a forward direction of a vehicle; arrow UP illustrates an upward direction thereof; and arrow IN denotes an inward direction of the vehicle in the transverse direction thereof.

Figure 2:
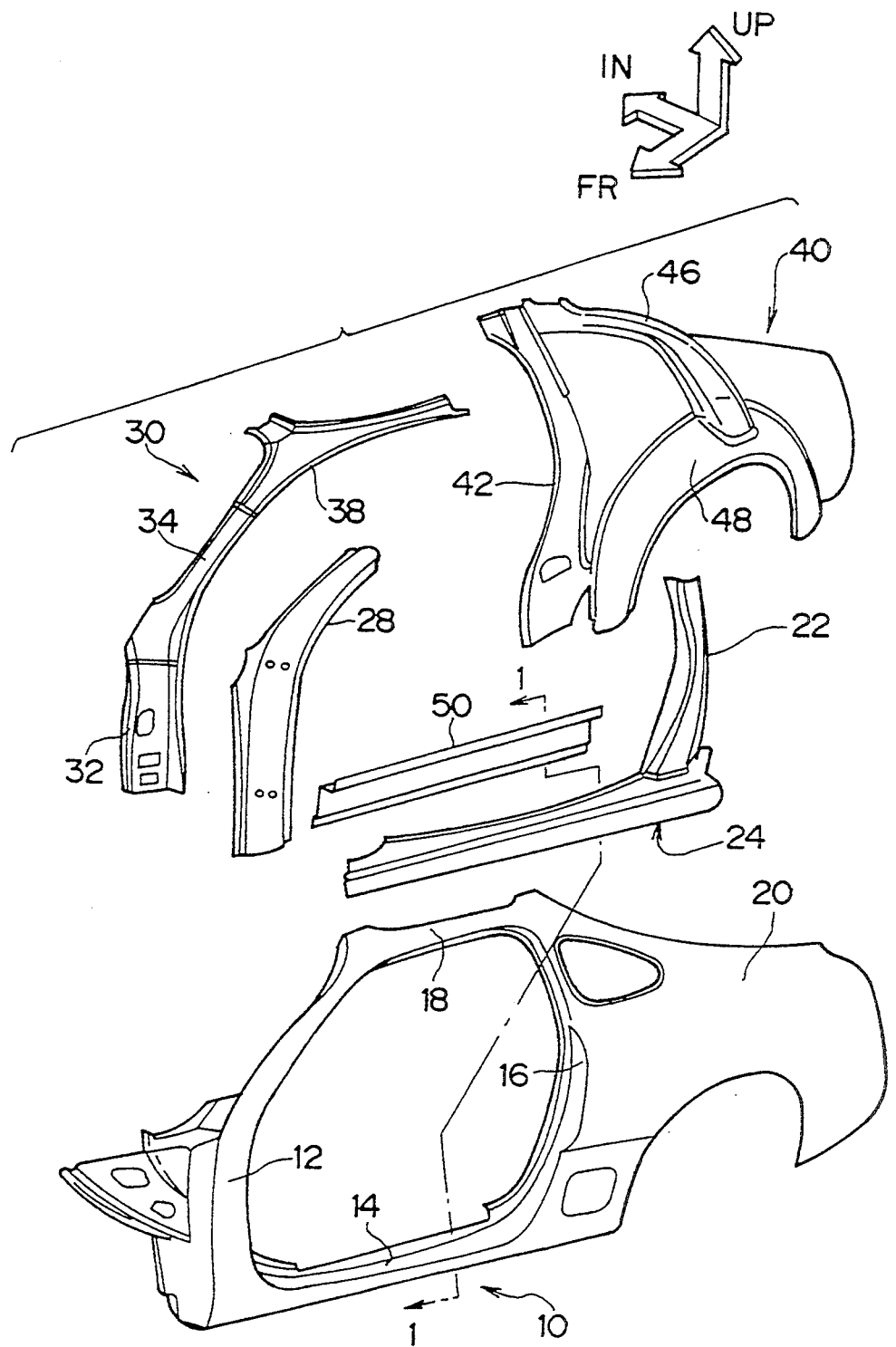
FIG. 2 is an exploded perspective view showing a structure of a side portion of a vehicle body which relates to an embodiment of the present invention.

As shown in FIG. 2, at a side member outer member 10, which serves as a side outer panel of a normal roof vehicle, a front pillar outer member 12, a side sill outer member 14, a center pillar outer member 16, a roof side rail outer member 18, a quarter panel 20 and the like are integrated. "Open roof vehicle" as used herein refers to a vehicle having a partially open roof, such as a vehicle having a sunroof, or a convertible or a T-top vehicle. "Normal roof vehicle" as used herein refers to a vehicle whose roof is not "open" as per the above definition.

A side sill reinforcing member 24 is connected to the inner side of the side sill outer member 14 of the side member outer member 10 in the transverse direction of the vehicle. A center pillar reinforcing member 22 is connected to the inner side of the center pillar outer member 16 of the side member outer member 10 in the transverse direction of the vehicle. A front pillar reinforcing member 28 is connected to the inner side of the front pillar outer member 12 of the side member outer member 10 in the transverse direction of the vehicle.

A front pillar sub-assembly 30 is connected to the inner sides of both the front pillar reinforcing member 28, which is connected to the front pillar outer member 12, and the roof side rail outer member 18 of the side member outer member 10 in the transverse direction of the vehicle. The front pillar sub-assembly 30 is formed integrally by a front pillar inner lower member 32, a front pillar inner upper member 34 and a roof side rail inner member 38.

A quarter inner sub-assembly 40 is connected to the inner sides of both the center pillar reinforcing member 22, which is connected to the center pillar outer member 16, and the quarter panel 20 of the side member outer member 10 in the transverse direction of the vehicle. The quarter inner sub-assembly 40 is formed integrally by a center pillar inner lower member 42, a quarter inner member 46 and a wheel house inner member 48.

A side sill inner member 50 is connected to the inner side of the side sill reinforcing member 24, which is connected to the side sill outer member 14, in the transverse direction of the vehicle.

Figure 1:
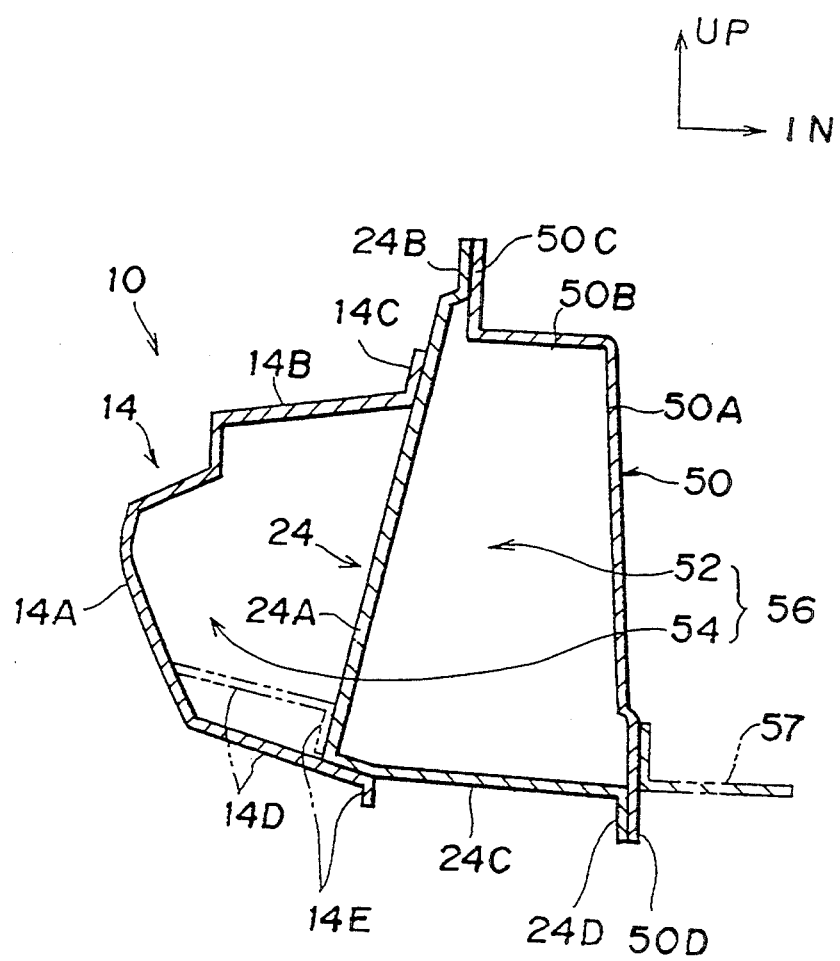
FIG. 1 is a cross-sectional view taken along line 1—1 of FIG. 2

As shown in FIG. 1, when viewed from the rear of the vehicle body, the cross-sectional configuration of the side sill inner member 50 is formed by a vertical wall portion 50A, an upper wall portion 50B and connecting flanges or side sill inner member flange members 50C and 50D. The upper end portion of the vertical wall portion 50A is bent outwardly in the transverse direction of the vehicle so as to form the upper wall portion 50B. The vertical wall portion 50A and the upper wall portion 50B form an inverted L-shape. An outwardly extending end portion of the upper wall portion 50B in the transverse direction of the vehicle is bent upwardly so as to form the connecting flange 50C. Further, the connecting flange 50D is formed at the lower end portion of the vertical wall portion 50A. The flange 50D protrudes inwardly by a small amount in the transverse direction of the vehicle.

When viewed from the rear of the vehicle body, the cross-sectional configuration of the side sill reinforcing member 24 is formed by a vertical wall portion 24A, connecting flanges or side sill reinforcing member flange members 24B and 24D, and a lower wall portion 24C. The vertical wall portion 24A is inclined so as to extend outwardly in the transverse direction of the vehicle towards the lower part of the vehicle body. The connecting flange 24B is formed at the upper end portion of the vertical wall portion 24A. The flange 24B projects inwardly by a small amount in the transverse direction of the vehicle. The flange 24B is connected to the connecting flange 50C of the side sill inner member 50. Further, the lower end portion of the vertical wall portion 24A is bent inwardly in the transverse direction of the vehicle so as to form the lower wall portion 24C. The vertical wall portion 24A and the lower wall portion 24C form a substantial L-shape. An inwardly extending end portion of the lower wall portion 24C in the transverse direction of the vehicle is bent downwardly so as to form the connecting flange 24D. The connecting flange 24D is connected to the connecting flange 50D of the side sill inner member 50. The side sill reinforcing member 24 and the side sill inner member 50 form an enclosed cross-sectional portion 52. The portion 52 is a first enclosed cross-sectional portion which extends in the longitudinal direction of the vehicle.

When viewed from the rear of the vehicle body, the cross-sectional configuration of the side sill outer member 14 forming the side member outer member 10 is substantially rectangular. An open portion of the side sill outer member 14 is directed inwardly in the transverse direction of the vehicle. A vertical wall portion 14A swells outwardly in the transverse direction of the vehicle. The upper end portion of the vertical wall portion 14A is bent inwardly in the transverse direction of the vehicle so as to form an upper wall portion 14B. The inwardly extending end portion of the upper wall portion 14B is bent upwardly so as to form a connecting flange 14C. The connecting flange 14C is connected to the vicinity of the upper end portion of the vertical wall portion 24A of the side sill reinforcing member 24. In addition, the lower end portion of the vertical wall portion 14A is bent downwardly and inwardly in the transverse direction of the vehicle so as to form a lower wall portion 14D. The inwardly extending end portion of the lower wall portion 14D in the transverse direction of the vehicle is connected to the under surface of the outer side of the lower wall portion 24C of the side sill reinforcing member 24 in the transverse direction of the vehicle. Accordingly, the side sill outer member 14 and the side sill reinforcing member 24 form an enclosed cross-sectional portion 54. The portion 54 is a second enclosed cross-sectional portion which extends in the longitudinal direction of the vehicle body. The enclosed cross-sectional portions 54 and 52 form a side sill cross section 56 of the vehicle body. Further, the inwardly extending end portion of the lower wall portion 14D of the side sill outer member 14 in the transverse direction of the vehicle is bent downwardly to form a flange 14E. Reference numeral 57 in FIG. 1 denotes a floor pan.

A description will now be given of the operation of the present embodiment.

According to the structure of the side portion of the vehicle body of the present embodiment, the connecting flange 14C of the side sill outer member 14 is connected to the vicinity of the upper end portion of the vertical wall portion 24A of the side sill reinforcing member 24 at a position located further outward, in the transverse direction of the vehicle, than the connecting portion of the side sill reinforcing member 24 and the side sill inner member 50. The connecting portion is, namely, a connecting portion between the connecting flange 24B of the side sill reinforcing member 24 and the connecting flange 50C of the side sill inner member 50. Further, an inner end portion of the lower wall portion 14D of the side sill outer member 14 in the transverse direction of the vehicle is connected to the under surface of the outer side of the lower wall portion 24C of the side sill reinforcing member 24 at a position located further outward, in the transverse direction of the vehicle, than the connecting portion between the connecting flange 24D of the side sill reinforcing member 24 and the connecting flange 50D of the side sill inner member 50.

Figure 3:
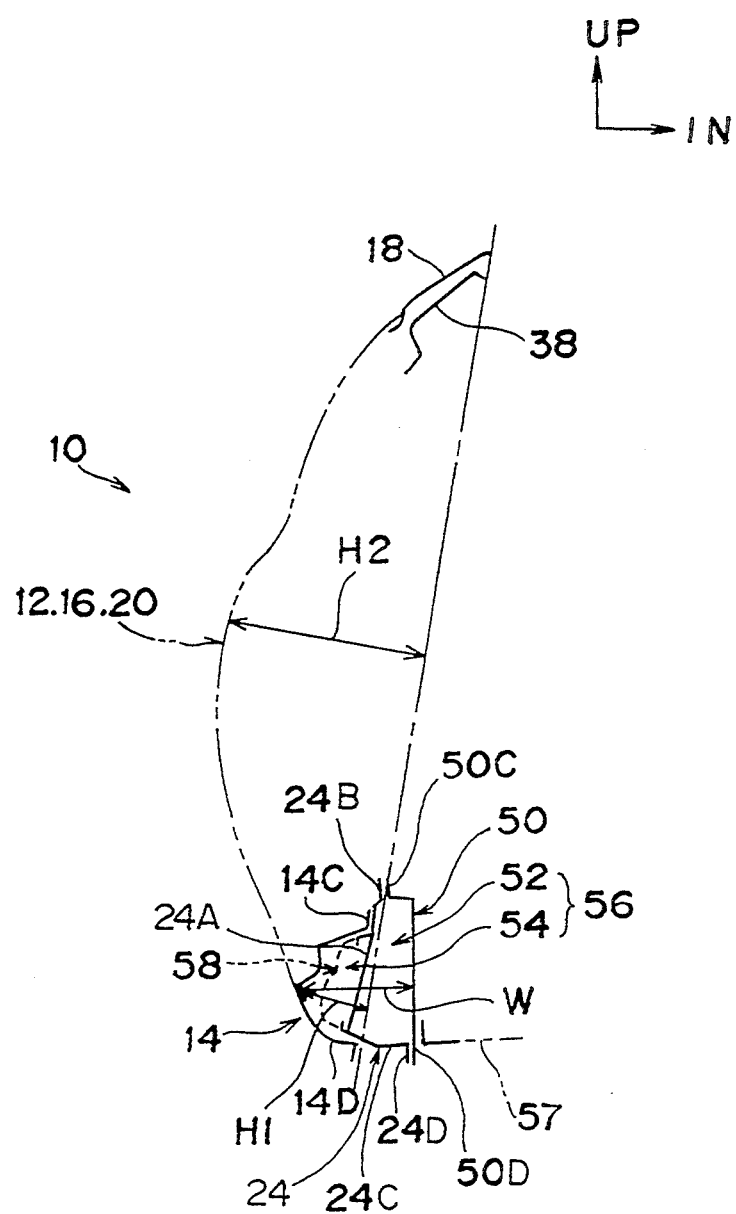
FIG. 3 is a schematic cross-sectional view, viewed from a rear side of the vehicle body, showing the structure of the side portion of the vehicle body which relates to the embodiment of the present invention.

Accordingly, as shown in FIG. 3, a proportion of a drawing depth H1 of the side sill outer member 14 forming the side member outer member 10 to the width W of the side sill cross section 56, which is formed by the enclosed cross-sectional portions 52 and 54, can be made smaller. (W is the maximum length of the cross-sectional lengths of the side sill in the transverse direction of the vehicle. H1 is the length of the longest normal line among a plurality of lines normal to a reference line whose lengths are respectively defined as a distance between the side sill outer member 14 and the reference line. The reference line connects the end portion which projects furthest inwardly in the transverse direction of the vehicle among the connecting portions between the roof side rail outer member 18 and the roof side rail inner member 38 in the upward direction of the vehicle, and a connecting portion of the lower wall portions 24C and 14D.) As a result, the difference between the amount H2 by which the front pillar outer member 12, the center pillar outer member 16, the quarter panel 20 or the like swell outwardly in the transverse direction of the vehicle and the drawing depth H1 of the side sill outer member 14, which forms the side member outer member 10 while maintaining rigidity of the side sill portion, can be made large. (H2 is the length of the longest normal line among a plurality of lines normal to the aforementioned reference line whose lengths are respectively defined as a distance between the side member outer member 10 and the reference line.) Therefore, the amount by which the design surface of the vehicle body swells outwardly in the transverse direction of the vehicle can be made larger.

In addition, according to the present embodiment, the connecting portions between the side sill outer member 14 and the side sill reinforcing member 24 are formed by superposing the side sill outer member 14 and the side sill reinforcing member 24. The connecting portions between the side sill reinforcing member 24 and the side sill inner member 50 are formed by superposing the side sill reinforcing member 24 and the side sill inner member 50. Accordingly, both connecting portions are easily welded even in a case in which the plate thickness of the side sill reinforcing member 24 is thickened. The aforementioned connecting portions between the side sill outer member 14 and the side sill reinforcing member 24 are the connecting portion between the connecting flange 14C of the side sill outer member 14 and the vicinity of the upper end portion of the vertical wall portion 24A of the side sill reinforcing member 24, and are the connecting portion between the inner end portion of the lower wall portion 14D of the side sill outer member 14 in the transverse direction and the under surface of the outer side of the lower wall portion 24C of the side sill reinforcing member 24 in the transverse direction. The connecting portions between the side sill reinforcing member 24 and the side sill inner member 50 are the connecting portion between the connecting flange 24B of the side sill reinforcing member 24 and the connecting flange 50C of the side sill inner member 50, and are the connecting portion between the connecting flange 24D of the side sill reinforcing member 24 and the connecting flange 50D of the side sill inner member 50.

Figure 4:
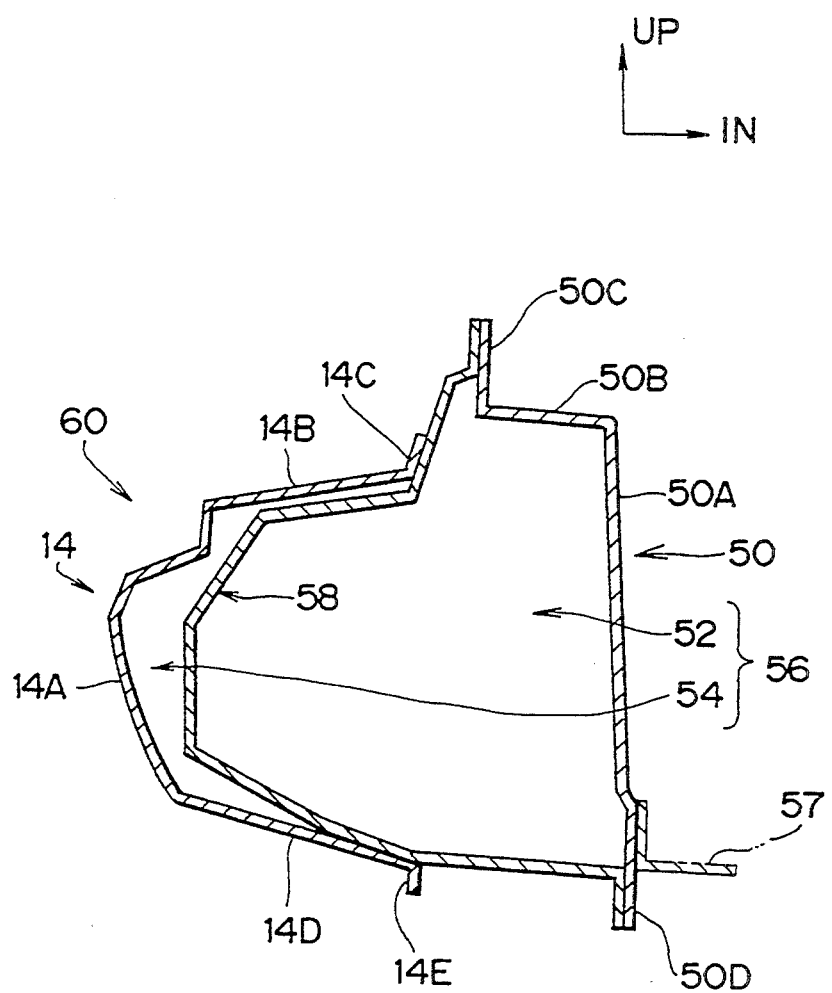
FIG. 4 is a cross-sectional view, corresponding to FIG. 1, of an open roof vehicle to which the structure of the side portion of the vehicle body relating to the embodiment of the present invention is applied.
Figure 5:
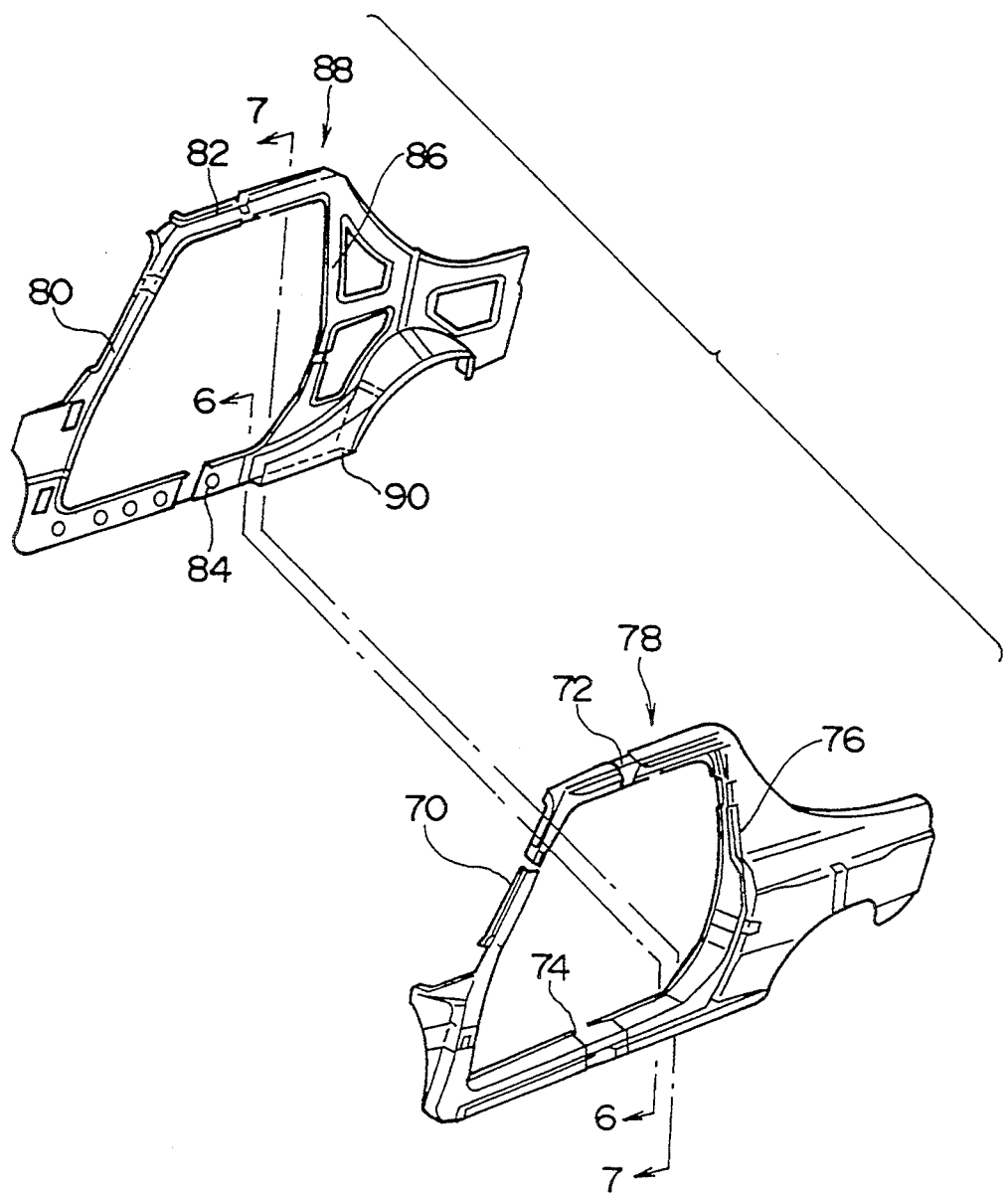
FIG. 5 is an exploded perspective view showing a structure of a side portion of a vehicle body which relates to a conventional example.
Figure 6:
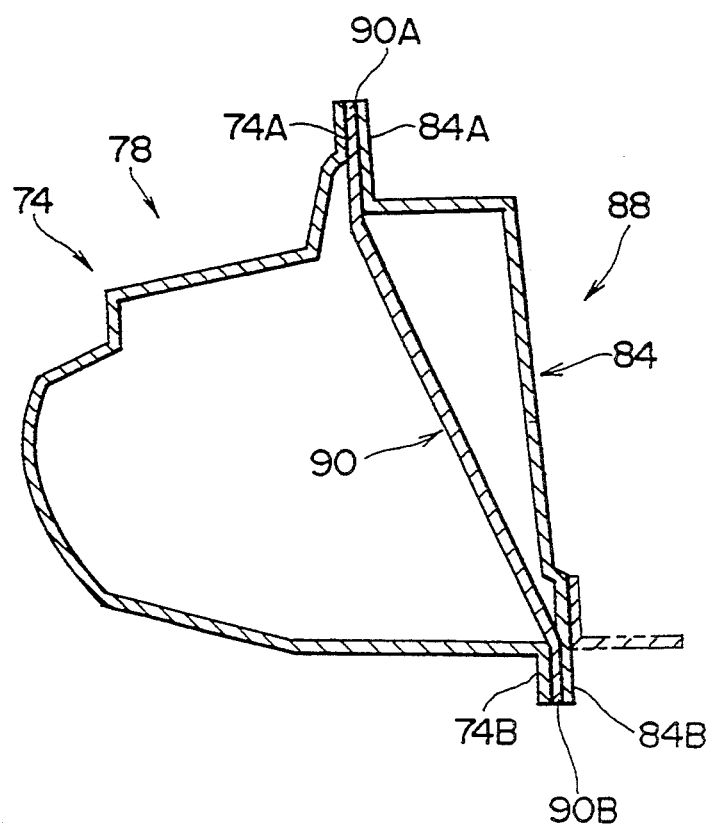
FIG. 6 is a cross-sectional view taken along line 6—6 of FIG. 5.
Figure 7:
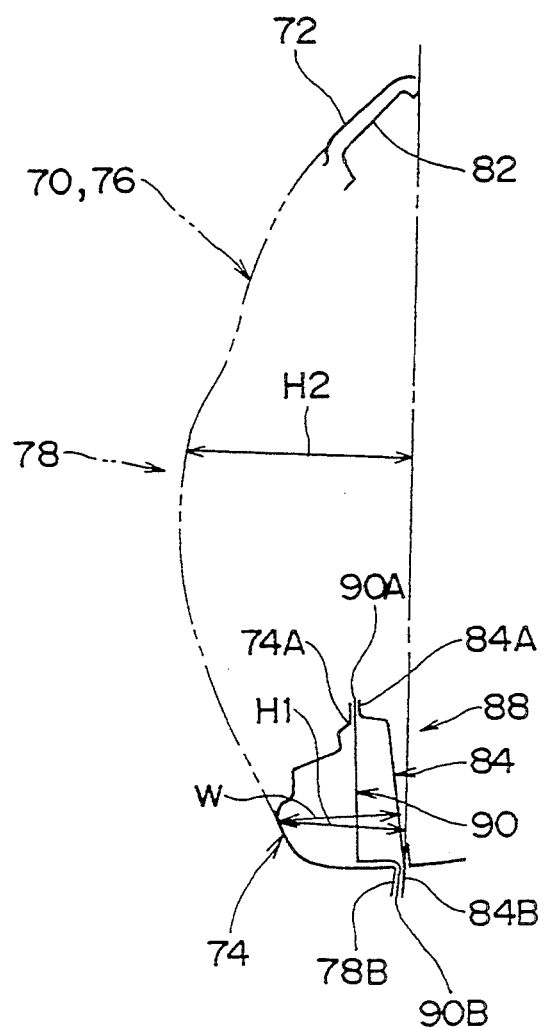
FIG. 7 is a cross-sectional view taken along line 7—7 of FIG. 5.

Further, according to the present embodiment, each of the connecting portions are formed by superposing two members, i.e., the side sill reinforcing member 24 and the side sill outer member 14, and the side sill reinforcing member 24 and the side sill inner member 50. In the case of an open roof vehicle, as shown in FIG. 4, the torsional rigidity of the side sill cross section 56 can be improved by increasing the plate thickness of the side sill reinforcing member 58. Accordingly, even if the plate thickness of the side member outer member 60 is equal to the plate thickness of the side member outer member 10 of the normal roof vehicle shown in FIG. 1, the torsional rigidity of the side sill cross section 56 can be improved. As a result, compared to a case in which the plate thickness of the entire side member outer member is increased to improve rigidity, the plate thickness of the quarter panel or the like need not be increased. Therefore, there is no weight increase due to an increase in thickness. In addition, since the torsional rigidity of the side sill cross section 56 can be improved by thickening the side sill reinforcing member 58 only, the rigidity of an open roof vehicle can be maintained without greatly changing the design of a normal roof vehicle or an open roof car.

In accordance with the present embodiment, as shown in FIG. 1, the inner end portion of the lower wall portion 14D of the side sill outer member 14 in the transverse direction of the vehicle is connected to the under surface of the outer side of the lower wall portion 24C of the side sill reinforcing member 24 in the transverse direction of the vehicle. However, as shown by the imaginary line in FIG. 1, the flange 14E of the side sill outer member 14 may be connected to the vicinity of the lower end portion of the vertical wall portion 24A of the side sill reinforcing member 24.

What is claimed is:

1. A structure of a side portion of a vehicle body having a side outer panel in which a side sill outer member and a pillar outer member are integrally formed, comprising:
   a side sill inner member, which is provided inwardly with respect to said side sill outer member in a transverse direction of the vehicle body;
   a side sill reinforcing member, which is provided between said side sill outer member and said side sill inner member;
   a first enclosed cross-sectional member formed by connecting said side sill inner member and said side sill reinforcing member such that a longitudinal direction of said first enclosed cross-sectional member runs substantially along a longitudinal direction of the vehicle body, said first enclosed cross-sectional member having first connecting members which are formed by connecting said side sill reinforcing member and said side sill inner member; and
   a second enclosed cross-sectional member formed by connecting said side sill outer member and said side sill reinforcing member such that a longitudinal direction of said second enclosed cross-sectional member runs substantially along the longitudinal direction of the vehicle body, said second enclosed cross-sectional member having second connecting members which are formed by connecting said side sill outer member and said side sill reinforcing member, and said second connecting members being located outwardly of said first connecting members in the transverse direction of the vehicle body and being apart from said first connecting members,
   wherein said side sill reinforcing member has a side sill reinforcing member flange member at each end thereof transverse direction thereof, side sill member flange members forming said first connecting members by being connected with said side sill inner member.

2. A structure of a side portion of a vehicle body according to claim 1, wherein said side sill outer member has a first flange member at one end portion thereof in a transverse direction thereof and a second flange member at another end portion thereof in the transverse direction thereof, at least one of said first flange member and said second flange member forming at least one of said second connecting members by being connected with a circumferential surface of an outer side of said side sill reinforcing member in the transverse direction of the vehicle body.

3. A structure of a side portion of a vehicle body according to claim 1, wherein said side sill inner member has a side sill inner member flange member at each end thereof in a transverse direction thereof, side sill inner member flange members forming said first connecting members by being connected with said side sill reinforcing member flange members.

4. A structure of a side portion of a vehicle body according to claim 1, wherein the connection of said side sill reinforcing member and said side sill inner member to form said first connecting member is effected by welding, and the connection of said side sill outer member and said side sill reinforcing member to form said second connecting member is effected by welding.

5. A structure of a side portion of a vehicle body according to claim 1, wherein a cross-section of said side sill reinforcing member in a vertical direction of the vehicle body is angled, and in a state in which said side sill reinforcing member is connected with said side sill inner member, said side sill reinforcing member has a first surface which runs substantially along the vertical direction of the vehicle body, and a second surface which runs substantially along the transverse direction of the vehicle body.

6. A structure of a side portion of a vehicle body according to claim 5, wherein said side sill outer member has a first flange member at one end thereof in a transverse direction thereof and a second flange member at another end thereof in the transverse direction thereof, at least one of said first flange member and said second flange member forming at least one of said second connecting members by being connected with said first surface.

7. A structure of a side portion of a vehicle body according to claim 6 wherein said first flange member is connected with said first surface, and a portion of a circumferential surface of said side sill outer member forms said second connecting members by being connected with said second surface.

8. A structure of a side portion of a vehicle body having a side outer panel in which a side sill outer member and a pillar outer member are integrally formed, comprising:
   a side sill inner member, which is provided inwardly with respect to said side sill outer member in a transverse direction of the vehicle body;
   a side sill reinforcing member, which is provided between said side sill outer member and said side sill inner member;
   a first enclosed cross-sectional member formed by connecting said side sill inner member and said side sill reinforcing member such that a longitudinal direction of said first enclosed cross-sectional member runs substantially along a longitudinal direction of the vehicle body, said first enclosed cross-sectional member having first connecting members which are formed by connecting said side sill reinforcing member and said side sill inner member; and
   a second enclosed cross-sectional member formed by connecting said side sill outer member and said side sill reinforcing member such that a longitudinal direction of said second enclosed cross-sectional member runs substantially along the longitudinal direction of the vehicle body, said second enclosed cross-sectional member having second connecting members which are formed by connecting said side sill outer member and said side sill reinforcing member, and said second connecting members being located outwardly of said first connecting members in the transverse direction of the vehicle body and being apart from said first connecting members
   wherein a cross-section of said side sill reinforcing member in a vertical direction of the vehicle body is angled, and in a state in which said side sill reinforcing member is connected with said side sill inner member, said side sill reinforcing member has a first surface which runs substantially along the vertical direction of the vehicle body, and a second surface which runs substantially along the transverse direction of the vehicle body, said side sill outer member having a first flange member at one end thereof in a transverse direction thereof and a second flange member at another end thereof in the transverse direction thereof, at least one of said first flange member and said second flange member forming at least one of said second connecting members by being connected with said first surface, wherein said first flange member is connected with said first surface, and a portion of a circumferential surface of said side sill outer member forms said second connecting members by being connected with said second surface.

9. A structure of a side portion of a vehicle body having a side outer panel in which a side sill outer member and a pillar outer member are integrally formed, comprising:

a side sill outer member, which has a first flange member at one end portion thereof in a transverse direction thereof and a second flange member at another end portion thereof in the transverse direction thereof;

a side sill inner member, which is provided inwardly of said side sill outer member in a transverse direction of the vehicle body, said side sill inner member having a third flange member at each end portion thereof in a transverse direction thereof;

a side sill reinforcing member, which is provided between said side sill outer member and said side sill inner member, said side sill reinforcing member having a fourth flange member at each end portion thereof in a transverse direction thereof;

a first enclosed cross-sectional member formed by a connecting of third flange members of said side sill inner member and fourth flange members of said side sill reinforcing member such that a longitudinal direction of said first enclosed cross-sectional member runs substantially along a longitudinal direction of the vehicle body, said first enclosed cross-sectional member having first connecting members which are formed by a connecting of said third flange members and said fourth flange members;

a second enclosed cross-sectional member formed by a connecting of said side sill outer member and said side sill reinforcing member such that a longitudinal direction of said second enclosed cross-sectional member runs substantially along the longitudinal direction of the vehicle body, said second enclosed cross-sectional member having second connecting members which are formed by a connecting of said side sill outer member and said side sill reinforcing member, and said second connecting members being located outwardly of said first connecting members in a transverse direction of the vehicle body and being apart from said first connecting members, wherein at least one of said first flange member and said second flange member forms at least one of said second connecting members by being connected with a circumferential surface of an outer side of said side sill reinforcing member in the transverse direction of the vehicle body.

10. A structure of a side portion of a vehicle body according to claim 9, wherein a cross section of said side sill reinforcing member in a vertical direction of the vehicle body is angled, and in a state in which said side sill reinforcing member is connected with said side sill inner member, said side sill reinforcing member has a first surface which runs substantially along the vertical direction of the vehicle body, and a second surface which runs substantially along the transverse direction of the vehicle body.

11. A structure of a side portion of a vehicle body according to claim 10, wherein said first flange member and said second flange member form said second connecting members by being connected with said first surface.

12. A structure of a side portion of a vehicle body according to claim 10, wherein said first flange member is connected with said first surface, and a portion of a circumferential surface of said side sill outer member forms said second connecting members by being connected with said second surface.

13. A structure of a side portion of a vehicle body according to claim 9, wherein the connection of said side sill reinforcing member and said side sill inner member to form said first connecting member is effected by welding, and the connection of said side sill outer member and said side sill reinforcing member to form said second connecting member is effected by welding.

* * * * *

UNITED STATES PATENT AND TRADEMARK OFFICE
CERTIFICATE OF CORRECTION

PATENT NO. : 5,443,297
DATED : August 22, 1995
INVENTOR(S) : TANAKA et al

It is certified that error appears in the above-indentified patent and that said Letters Patent is hereby corrected as shown below:

TITLE PAGE

Please change:

"[73] Assignee: Toyoda Jidosha. . ."

to

-- [73] Assignee: Toyota Jidosha. . .--

Signed and Sealed this

Twenty-third Day of April, 1996

Attest:

BRUCE LEHMAN

Attesting Officer

Commissioner of Patents and Trademarks